Charles Hastings' Bee Hive.

No. 73096

PATENTED
JAN 7 1868

Witnesses.
Cornelius Cox
E. A. Shaw

Inventor.
Charles Hastings
per
Alexander Mason
Atty.

United States Patent Office.

CHARLES HASTINGS, OF DOWAGIAC, MICHIGAN.

Letters Patent No. 73,096, dated January 7, 1868.

IMPROVEMENT IN BEE-HIVES.

*The Schedule referred to in these Letters Patent and making part of the same.*

TO ALL WHOM IT MAY CONCERN:

Be it known that I, CHARLES HASTINGS, of Dowagiac, in the county of Cass, and in the State of Michigan, have invented certain new and useful Improvements in Bee-Hives; and I do hereby declare that the following is a full, clear, and exact description thereof, reference being had to the accompanying drawings, and to the letters of reference marked thereon, making a part of this specification.

Figure 1:
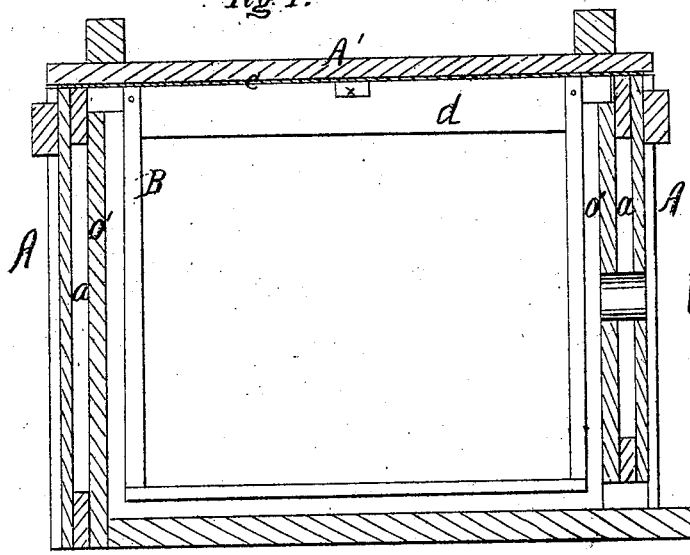

Figure 1 represents a longitudinal vertical section, and

Figure 2:
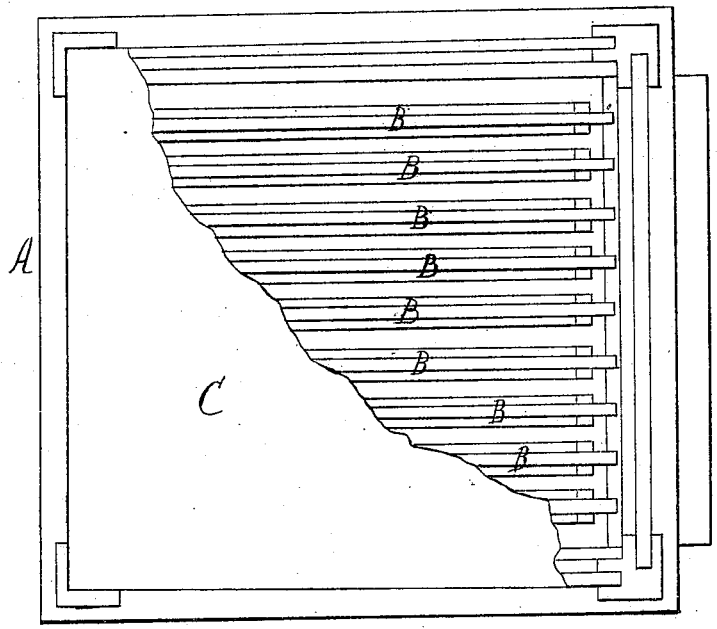

Figure 2 a plan view, with the top or lid of the hive taken off.

In the annexed drawings, A represents a rectangular box, having a suitable lid or cover, A'. This box is formed with an outer and an inner wall, O', leaving a dead-air space, $a$, between the two. The inner wall O' does not extend quite to the top of box, so as to leave a suitable ledge for the comb-frames to be suspended from. B B represent a series of the comb-frames, which are formed of four narrow strips of plank, the top one of which is a little wider than the width of the frame, forming projections on each side, whereby the frame is supported upon the tops of the inner wall, O', as before described. This top bar $d$ is placed edgewise into narrow slots in the top of the two side bars, and is bevelled at the lower edge, being provided with a notch, $x$, in its centre at the top, (see fig. 1.) When placed upon the ledge, the top of these frames is flush with the upper edge of the top. Upon the top of the frames is placed a sheet of paper, C, cloth, or other similar substance, so as to prevent the bees from building their combs either between the frames, or connecting the combs to the under part of the lid. This feature is one of no little moment in the practical keeping of bees, as all apiarists will readily testify to it, being a well-established fact that the bees and frames have to be taken out and cleansed oftentimes when building their combs. By this simple device, the bees are compelled to build their combs straight from the frames. It will be seen that these frames do not touch the sides or bottom of the box, and are placed at suitable distances from each other, so that one frame can be taken from the hive without disturbing the others. When the frames are thus suspended, the bees are free to operate in the hive, and can pass and repass over the frames through the recesses $x\ x$, heretofore described.

This hive, being constructed in an economical and practical form, will effectually accomplish the objects for which it is designed, being provided with suitable openings for the entrance of the bees and ventilation, while having the air-space to protect the young bee.

I am aware that bee-hives having dead-air spaces are known; also that brood-frames have been constructed with paper around their sides.

What I claim, is—

The combination of the box A with an air-chamber, $a$, and a series of movable comb-frames, B B, with recesses $x\ x$. Said frames and recesses are covered with paper, C, or equivalent material, as and for the purposes specified.

In testimony that I claim the foregoing, I have hereunto set my hand, this 18th day of September, 1867.

CHAS. HASTINGS.

Witnesses:
J. MONROE McNAIR,
N. B. HOLLISTER.